US009416944B2

(12) United States Patent
Gibson et al.

(10) Patent No.: US 9,416,944 B2
(45) Date of Patent: Aug. 16, 2016

(54) REFLECTIVE COLOR DISPLAY WITH LUMINESCENCE AND BACKLIGHTING

(75) Inventors: Gary Gibson, Palo Alto, CA (US); Xia Sheng, Mountain View, CA (US); Richard H. Henze, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 206 days.

(21) Appl. No.: 14/356,845

(22) PCT Filed: Dec. 8, 2011

(86) PCT No.: PCT/US2011/064016
§ 371 (c)(1),
(2), (4) Date: May 7, 2014

(87) PCT Pub. No.: WO2013/085527
PCT Pub. Date: Jun. 13, 2013

(65) Prior Publication Data
US 2014/0293578 A1  Oct. 2, 2014

(51) Int. Cl.
*G02F 1/133* (2006.01)
*F21V 13/08* (2006.01)
*G02F 1/1335* (2006.01)
*F21V 33/00* (2006.01)

(52) U.S. Cl.
CPC .............. *F21V 13/08* (2013.01); *F21V 33/0052* (2013.01); *G02F 1/133617* (2013.01); *G02F 2001/133618* (2013.01)

(58) Field of Classification Search
CPC .............. G02F 1/133617; G02F 2001/133618; G02F 2001/133557; G02F 1/133621; F21V 13/08; F21V 33/0052
See application file for complete search history.

(56) References Cited

U.S. PATENT DOCUMENTS

| 2004/0027510 | A1* | 2/2004 | Iijima | ............... G02F 1/133528 349/61 |
| 2004/0160551 | A1* | 8/2004 | Wang | ................. G02F 1/133502 349/96 |
| 2004/0218121 | A1* | 11/2004 | Zhuang | ................... G02F 1/093 349/114 |
| 2008/0158480 | A1* | 7/2008 | Ii | ....................... G02F 1/133621 349/71 |

FOREIGN PATENT DOCUMENTS

| KR | 2004177726 | 6/2004 |
| KR | 10-2011-0059984 | 6/2011 |
| WO | WO-2011053283 | 5/2011 |

OTHER PUBLICATIONS

Gibson, et al.; "Luminescent Enhancement of Reflective Displays" Jul. 6, 2010; 3 pages.
PCT; "Notification of Transmittal of the International Search Report and the Written Opinion of the International Searching Authority, or the Declaration"; cited in PCT/US2011/064016; mailed Aug. 22, 2012; 8 pages.

* cited by examiner

*Primary Examiner* — James Dudek
(74) *Attorney, Agent, or Firm* — HP Inc. Patent Department

(57) ABSTRACT

A reflective color display has at least a color pixel disposed to receive ambient light for front lighting and has a light source optically coupled to the color pixel to provide back light for backlighting. The color pixel has a first sub-pixel and a second sub-pixel. The first sub-pixel has a first luminescent layer with a luminescent material for converting a portion of the ambient light spectrum into light of a first color. An unpatterned mirror is disposed under the luminescent layer of the first sub-pixel and extends through the first and second sub-pixels. The unpatterned mirror reflects at least light of the first color while transmitting the back light to the first luminescent layer for conversion by the first luminescent material into light of the first color.

17 Claims, 6 Drawing Sheets

REFLECTIVE COLOR DISPLAY WITH LUMINESCENCE AND BACKLIGHTING

BACKGROUND

Reflective electronic displays are gaining popularity as new technologies are providing improved image quality compared to traditional twisted nematic liquid crystal displays. For instance, reflective displays are now used in electronic book readers and commercial signage applications. In contrast to conventional flat-panel displays, such as LCD displays, that require their own light sources, reflective displays utilize ambient light for illumination to display images that can mimic the look of "ink-on-paper" printed materials. Due to the use of ambient light for illumination, reflective displays have the significant advantages of lower power consumption compared to conventional displays, and the ability to be viewed under bright ambient light. Most of the reflective displays currently commercially available are monochromatic displays, and it is desirable to have reflective displays that can produce color images with satisfactory color brightness. Moreover, it is also desirable to have reflective color displays that can be viewed in dim ambient light or darkness. To date, there is no commercial reflective display that provides a full color gamut viewable in both bright and low-light conditions.

BRIEF DESCRIPTION OF THE DRAWINGS

Some embodiments of the invention are described, by way of example, with respect to the following figures.

DETAILED DESCRIPTION

In embodiments described in detail below, different structures of color pixels of a reflective color display are shown to combine luminescence and backlighting to provide enhanced color brightness, more balanced color gamut, an the versatility of being viewable even in low-light conditions.

Figure 1:
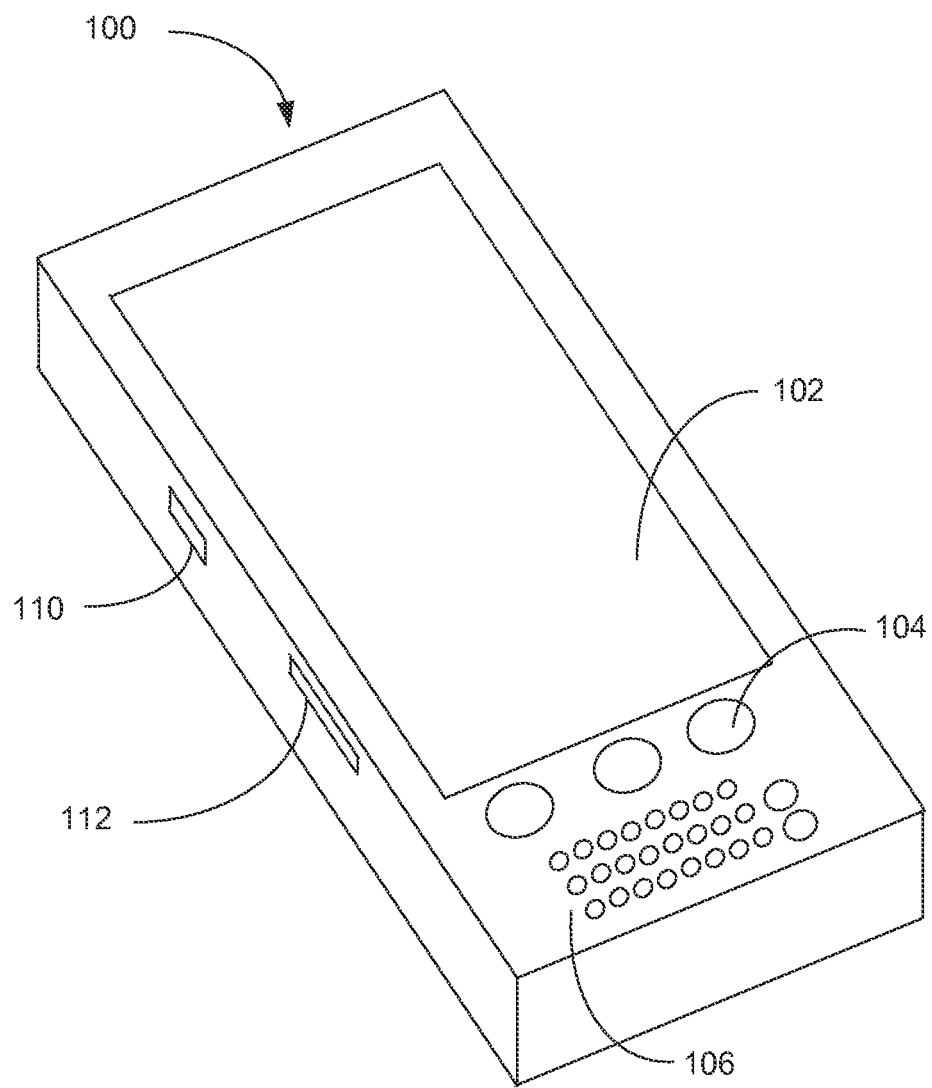
FIG. 1 is a schematic view of a mobile device with a reflective color display which may be constructed according to an embodiment of the invention.

FIG. 1 shows, as an example, one application of a display device with reflective color pixels constructed in accordance with an embodiment of the invention. As described in greater detail below, the display device 100 has a reflective color display screen 102 that is capable of displaying images of high color quality and is configured to utilize backlighting to allow the device to be viewed in dim ambient light.

The device 100 has a built-in power source, such as a rechargeable battery, and has electronic circuitry and software for its operations. As illustrated in FIG. 1, the device 100 may have buttons 104 for controlling image display functions and may have a keypad 106 for data entry. Moreover, the display screen 102 may be a touch-screen that can display control features such as scroll bars or control buttons. The display device 100 further includes means for receiving data of images to be displayed. For instance, the device 100 may have USB ports 110 for receiving data and power transmitted through a USB cable, or to receive a USB memory stick with the image date stored thereon. The device 100 may also have receptacles, such as an SD card slot 112, for other types of data storage devices. Alternatively, the device 100 may have wireless transmission capabilities for wirelessly downloading image data from a computer or a network such as the internet.

Figure 2:
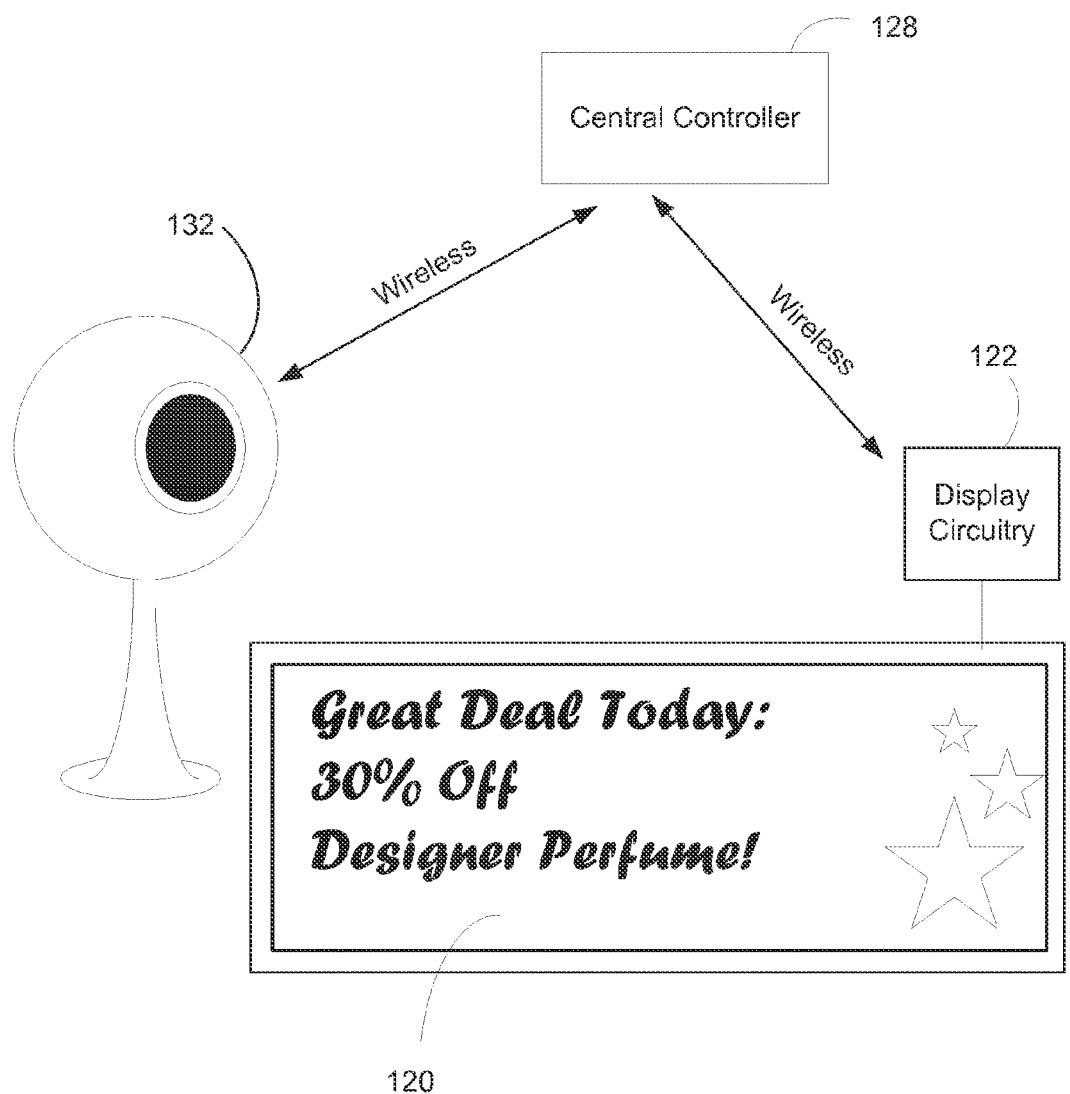
FIG. 2 is a schematic view of a reflective color display device constructed according to an embodiment of the invention and used in a commercial signage application.

A reflective color display constructed according to an embodiment of the invention may also be advantageously used in electronic signage applications in commercial or public information settings. FIG. 2 shows such an example. In this example, a reflective color display 120 is part of a sign that may be placed in a commercial venue such as a store to display advertising information containing graphics and/or text. A display circuitry 122 supplies the display control signals to operate the pixels on the color display device 120 to displays a desired image. The display circuitry 122 may communicate via wireless connections with a central controller 128 that sends image data to be displayed to the display circuitry. A sensing device, such as an optical sensor or a video camera 132, may be placed in the vicinity of the electronic sign to capture information that can be used by the central controller 128 to determine the information to be displayed on the sign. For instance, the video camera 132 may capture images of customers, and the images can be analyzed by the central controller to identify demographic data regarding the customers. The controller can then select information to be displayed on the sign based on the demographic data.

Figure 3:
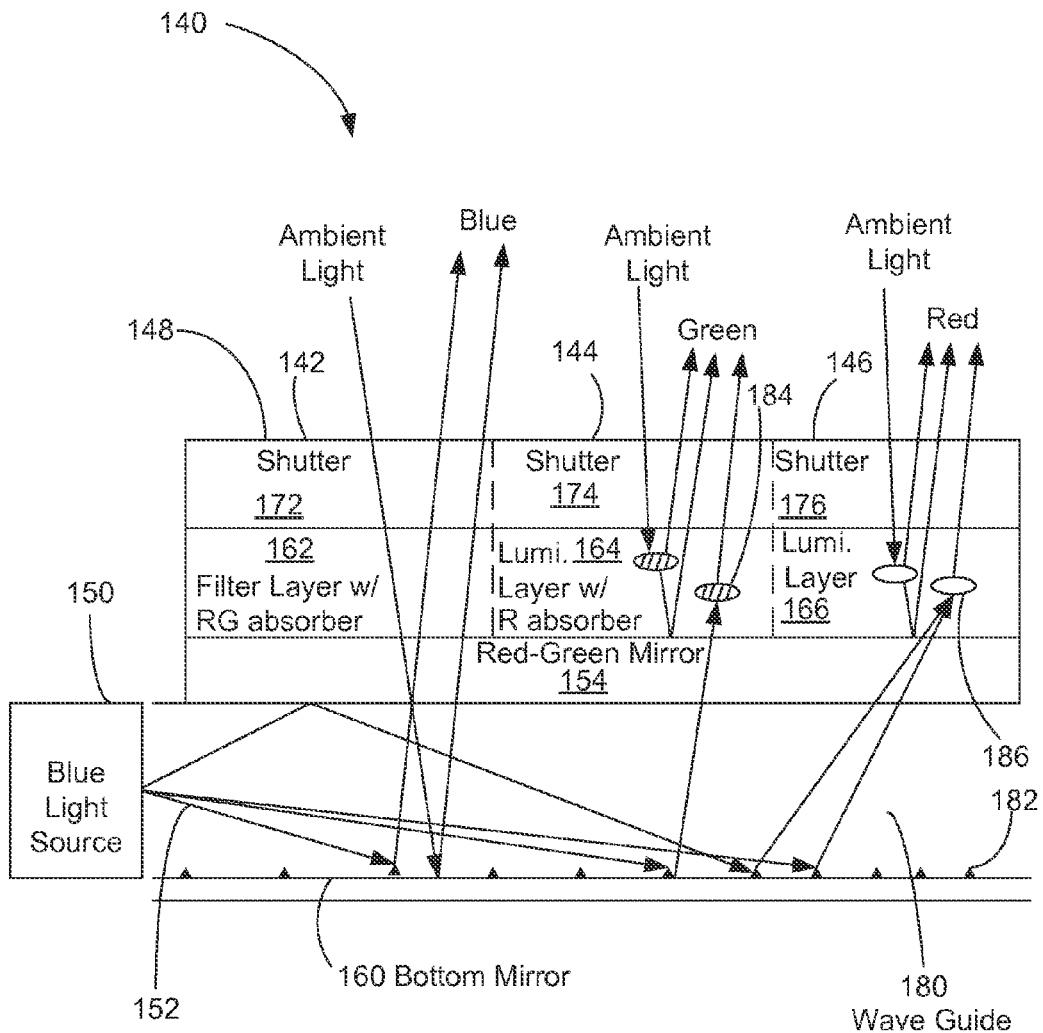
FIG. 3 is a schematic cross-sectional view of a color pixel of a reflective color display constructed according to an embodiment of the invention to utilize backlighting to provide enhanced color brightness and to enable viewing in dim ambient light.

FIGS. 3-6 show multiple embodiments of reflective color pixels that combine vibrant colors generated using luminescence with the enhanced viewing flexibility provided by backlighting. Turning first to FIG. 3, in this embodiment, the reflective color pixel 140 has three sub-pixels 142, 144, 146, for generating blue, green, and red light, respectively. Alternatively, other sets of primary colors can be used for display and different numbers of sub-pixels can be used. As described in greater detail below, the blue sub-pixel 142 in this example generates blue light by means of wavelength-filtered reflection, while the green and red sub-pixels 144 and 146 utilize luminescence to generate their respective colors.

The red sub-pixel 146 has two upper layers that include a shutter 176, and a luminescent layer 166. Similarly, the green sub-pixel 144 has a shutter 174 and a luminescent layer 164. The blue sub-pixel also has a shutter 172, but does not have a luminescent layer. Instead, it has a filter layer 162 that filters out red and green light and passes blue light. The shutters 172, 174, 176 of the sub-pixels 142, 144, 146 can be independently actuated to adjust the light transmission through each sub-pixel to result in the desired lightness. In some embodiments, they may be black to clear (K/clr) electro-optic (EO) shutters, which may be in the form of, for example, dichroic dye-LC guest-host systems, electrophoretic, electro-wetting, or electro-fluidic cells. The shutters are capable of switching from transparent through shades of gray to opaque (black).

The luminescent layer 166 of the red sub-pixel 146 contains luminophores 186 (illustrated as unfilled ovals) that absorb a broad spectrum of shorter wavelength light and convert it to wavelengths in the red. For example, the red luminophores may absorb wavelengths shorter than 600 nm, and emit in the range of 600-630 nm. These luminophores may be a series of organic relay dyes in a transparent host polymer. All but the first (highest energy) type of these dyes absorb in a wavelength band that overlaps strongly with the emission band of the previous (next higher energy) type, allowing Förster energy transfer from one dye to the next in the series. Similarly, the luminescent layer of the green sub-pixel contains luminophores 184 (illustrated as hashed ovals) for converting ambient light into green light, and each of the green luminophores may be a series of relay dyes. The green luminophores 184 may, for example, absorb wavelengths shorter than 540 nm, and emit in the range of 540-570 nm.

Extending underneath the upper layers of the three sub-pixels is a red-green dichroic mirror 154 that reflects red and green light and transmits blue light. The mirror 154 is unpatterned in the sense that it extends continuously through the three sub-pixels, and is not partitioned into small regions to correspond to the areas of the sub-pixels. Due to the reflection of the mirror 154, the luminescent light generated by the green luminophores 184 in the downward direction is reflected toward the upper surface 148 of the pixel for viewing. The mirror 154 may also reflect those ambient green wavelengths that are not absorbed by the green-emitting luminophores 184. Similarly, the mirror 154 reflects the red light generated by the fed luminophores 186 in the red sub-pixel 146, and may also reflect ambient red wavelengths that are too long to be absorbed by the red luminophores.

Figure 7:
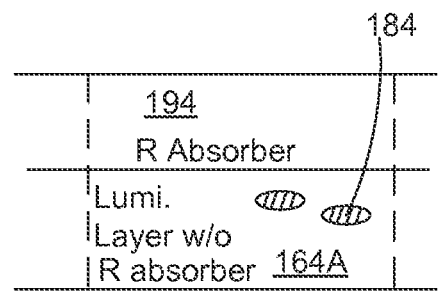
FIG. 7 is a schematic cross-sectional view of two layers as an alternative arrangement for a portion of the embodiment in FIG. 3.

To prevent the inclusion of red light in the output of the green sub-pixel 144, a material that absorbs red wavelengths may be added to the composite in the green luminescent layer 164. For example, the red-absorbing material may be red-absorbing dyes or pigments. The red-absorbing material absorbs incident ambient red wavelengths which, when reflected by the mirror 154 and if not absorbed, could pollute the color state of green sub-pixel 144. Alternatively, as shown in FIG. 7 the red-absorbing species may be included in a separate layer 194 disposed above or below a luminescent layer 164A containing the green luminophores 184. For simplicity of illustration, rather than repeating the structure of the entire color pixel only these two layers are shown in FIG. 7. Using a separate red-absorbing underlayer or overlayer can add some complexity in fabrication, but may have the advantage that the absorption edge of the red absorbing material can be slightly closer to the emission band of the green emitter without too much energy from the green emitter being transferred to and absorbed by the red absorber.

Returning to FIG. 3, an advantage of using the mirror 154 to reflect both red and green is that it does not have to be patterned according to the boundaries of the sub-pixels. Using an unpatterned mirror can significantly simplify the fabrication process. In contrast, if a red-only mirror is placed within the red pixel and a separate green-only mirror is placed within the green pixel, extra lithography steps will be needed to pattern the separate color-selective mirrors, and the fabrication of such small mirrors of different colors can be much more complicated and costly, especially when the mirrors are Bragg stacks each with multiple layers that depend on the particular color.

The mirror 154 may be made to be somewhat diffusive to help the luminescent light escape instead of being trapped in waveguide modes within the luminescent layers 164 and 166. Also, a low refractive index layer may be placed between the luminescent layers 164, 166 and the shutters 172, 174, 176 to minimize trapping of luminescent light in waveguide modes, particularly in the shutter layer where waveguided light could be rapidly absorbed. Including this low refractive index layer improves the fraction of luminescent light that can be coupled out of the device.

The blue sub-pixel 142 produces blue light by reflecting the blue wavelengths in the incident ambient light. The ambient light goes through the shutter 172 and is reflected by a bottom mirror 160. To achieve the desired color state, a filter layer 162 containing a material absorbing red and green is included in the blue sub-pixel 172. Multiple absorbing species can be used for the purpose of removing unwanted red and green wavelengths. This red-green absorbing layer 162 removes red and green wavelengths from the incident ambient light and also from the light reflected by the mirror 160, such that only blue light is emitted by the blue sub-pixel.

To provide the light for backlighting the color pixel 140, the display 140 includes a light source 150. In the embodiment of FIG. 3, the light source 150 is disposed to the side of the pixel, i.e., in a lateral arrangement. For conducting the light generated by the light source 150 to the pixels of the display, a waveguide 180 is disposed underneath the sub-pixels 142, 144, 146, with the bottom mirror 160 defining a lower surface of the waveguide. The waveguide 180 may be formed of a layer of transparent material with a high refractive index, for instance polymers such as polycarbonate and polyethylene terephthalate (PET), or inorganic materials such as high index glasses and indium tin oxide, or metal oxides, or metal oxide loaded polymers. Optionally, a low index layer may be included above the high index layer to provide a greater change in the index of refraction at the interface, which can make the waveguide less "leaky." The waveguide 180 may extend below all pixels of the reflective color display 140. Alternatively, the display may be divided into multiple segments, and each segment may have its own waveguide that extends below all pixels in that segment. For each waveguide, multiple light sources can be used.

The light 152 generated by the light source 150 has a wavelength that can be absorbed by the luminophores of the color sub-pixels. In the example of FIG. 3, the light source 150 emits blue light. The blue light source 150 may be, for example, a blue LED, or a blue-emitting organic LED (OLED) based on organic polymers or small molecules. The blue back light 152 can be absorbed by the green and red luminophores 184, 186 in the green and red sub-pixels 144, 146 to generate green and red luminescent light, respectively. In the meantime, the blue back light 152 can also be emitted through the blue sub-pixel 142 for viewing. The bottom mirror 160, which reflects the back light into the sub-pixels, has a reflection range that includes the range of wavelengths (e.g., <485 nm) to be emitted by the blue sub-pixel 142, which overlaps with the range of wavelengths provided by the blue back light. In this regard, the bottom mirror 160 may even be a broadband mirror, as long as it includes the desired blue reflection range.

To provide a controlled distribution of the back light, scattering structures 182 can be included in the waveguide 180 to help direct the back light into the sub-pixels. The scattering structures 182 can have various shapes, such as pyramidal or other profiles, for scattering incident light into different directions. The density of these scattering structures 182 can be designed to provide the desired distribution of the back light. For instance, the density of the scattering structures 182 may increase with increasing distance from the blue light source 150 to compensate for decreasing light intensity within the waveguide and homogenize the light power reaching the sub-pixels across the display. The density of scattering structures can also be varied for the different color sub-pixels.

In operation, the color pixel 140 may be front-lit by the ambient light and/or backlit by the light generated by the light source 150. If the ambient light is sufficiently bright for the display to produce a viewable image, the light source 150 may be turned off to save power. For the pixel 140 to produce only the red color, the shutter 176 of the red sub-pixel 146 is opened, and the shutters 174, 172 of the green and blue sub-pixels are closed. The ambient light incident on the red-pixel 146 goes through the shutter 176, and those wavelengths that are within the absorption band of the luminophores 186 are absorbed by the luminophores. The red light generated by the luminophores 186 from this absorbed light either goes directly through the shutter 176 and the top surface 148 or is reflected by the mirror 154 and then goes through the shutter 176 and the top surface. The red portion of the ambient light that is not absorbed by the red luminophores 186 may also be reflected by the red mirror 156 to the viewer.

Under low ambient light conditions, the light source 150 may be turned on to provide backlighting. The blue light 152 generated by the light source is guided by the waveguide 180 to the red sub-pixel 146 and reaches the luminescent layer 166. The red luminophores 186 absorb the blue back light and convert it to red light for emission by the red sub-pixel 146. It should be noted that the blue light source 150 can be turned on to augment the output of the red sub-pixel even when the ambient light is not completely gone. In other words, ambient lighting (or front lighting) and backlighting can be used simultaneously to provide a viewable image.

The operation of the green sub-pixel 144 is similar to that of the red sub-pixel 146. For the pixel 140 to generate only green light, the shutter 174 of the green sub-pixel 144 is opened and the shutters 172, 176 of the blue and red sub-pixels are closed. The green luminophores 184 absorb shorter wavelengths of the ambient light and/or the blue backlight transmitted by the waveguide 180, and generate green luminescent light as the output of the green sub-pixel. In this case, ambient red light that is not absorbed by the green lumino-phores 184 is absorbed by the red-absorbing material in the green sub-pixel.

The blue sub-pixel 142, in contrast, returns blue light through wavelength-filtered reflection. For the pixel 140 to return only blue, the shutter 172 of the blue sub-pixel 142 is opened and the shutters 174, 176 of the green and red sub-pixels are closed. The ambient light incident on the blue sub-pixel 142 is filtered by the red-green absorbing material in the layer 162 and reflected by the bottom mirror 160, and the resultant blue light goes through the top surface 148 for viewing. When the light source 150 is turned on, the blue back light generated by the light source is reflected by the bottom mirror 160 and can be used to form a part or all of the emission of the blue sub-pixel, depending on the ambient lighting condition.

To create a black state, all the shutters 172, 174, 176 of the three sub-pixels are closed. To create a white state, all the shutters are opened, if the sub-pixel areas and relevant efficiencies are balanced so as to create a net white state. Otherwise, some of the shutters can be partially opened in order to create a balanced white.

Figure 4:
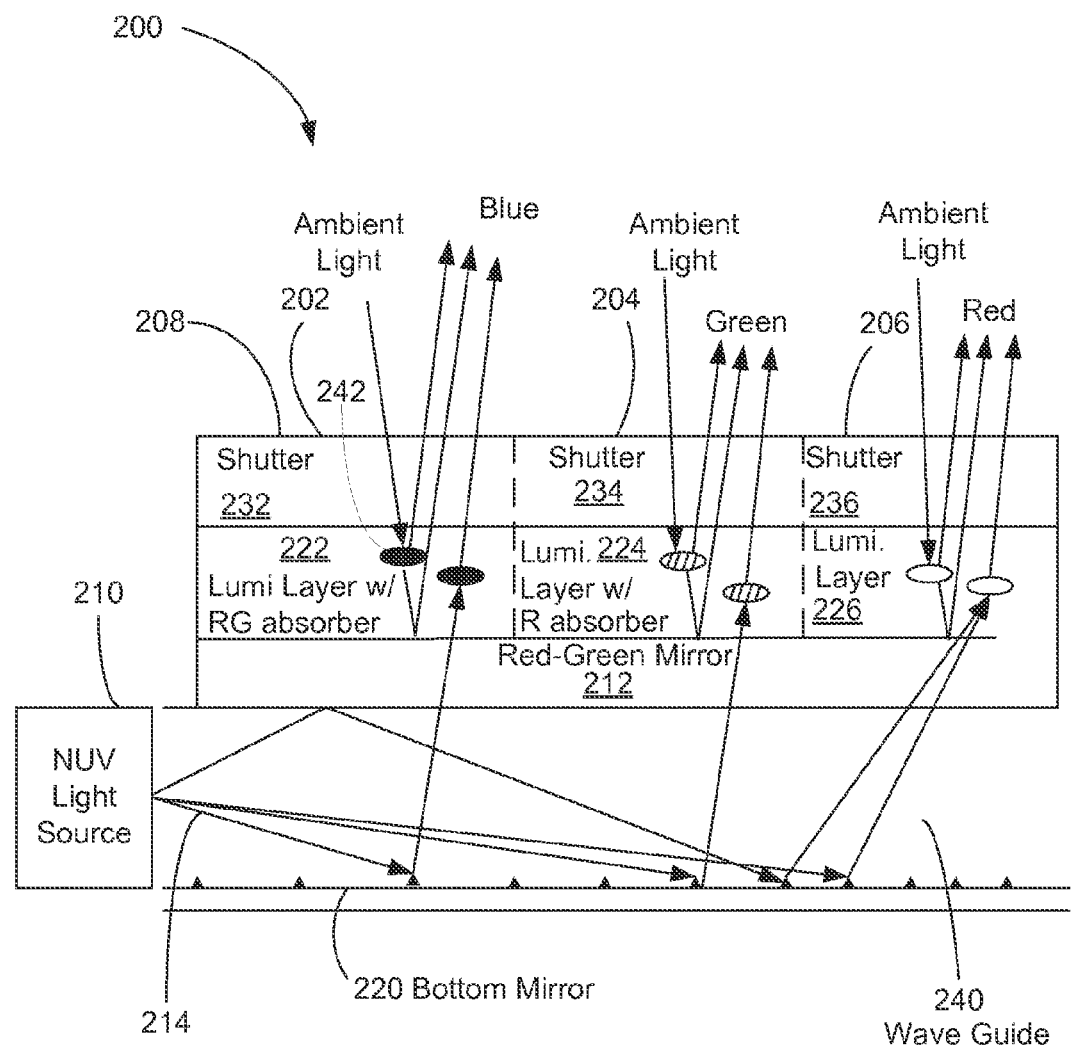
FIG. 4 is a schematic cross-sectional view of a color pixel in a reflective color display of another embodiment that uses near ultraviolet (NUV) light for backlighting.

FIG. 4 shows another embodiment of a reflective color pixel 200 that combines luminescence with backlighting. The color pixel 200 has a blue sub-pixel 202, a green sub-pixel 204, and a red sub-pixel 206. Each of the blue, green, and red sub-pixels has three top layers that include a shutter and a luminescent layer. A waveguide 240 is disposed below the three sub-pixels 202, 204, and 206, and a light source 210 for backlighting is optically coupled to the waveguide.

In this example, the shutters 234, 236, and luminescent layers 224, 226, of the green and red sub-pixels 204, 206 are structured and operate similarly as those in the example of FIG. 3. Also, an unpatterned mirror 212 extends through all three sub-pixels 202, 204, and 206. In contrast with the example of FIG. 3, however, the pixel 200 utilizes luminescence for the emission of blue light, and the mirror 212 reflects red, green and blue wavelengths. The shutter 232 of the blue sub-pixel 202 controls light transmission into and out of the blue sub-pixel. The luminescent layer 222 of the blue sub-pixel 202 contains blue luminophores 242 (illustrated as solid ovals) that absorb near ultra violet (NUV) light and convert it to blue emission (e.g., 455-485 nm). The blue light emitted by the blue luminophores 242 may go directly up through the shutter 232, or go down and be reflected by the mirror 212 and then up through the shutter 232 for viewing. Red and blue wavelengths, which are not absorbed by the blue luminophores 242, are removed from the output of the blue sub-pixel by filtering. To that end, the blue sub-pixel 202 may contain a red-green absorbing material, which may be mixed with the luminescent material in the luminescent layer 222, or in a separate layer below or above the luminescent layer 222.

The light source 210 generates near ultra violet (NUV) light 214, which is guided by the waveguide 240 to the sub-pixels 202, 204, 206. To that end, the waveguide 240 has a bottom mirror 220 that reflects the NUV back light. In operation, the ambient light provides front lighting. The blue luminophores 242 absorb shorter wavelengths in the ambient light and generate blue luminescent light. When the light source 210 is turned on, the NUV back light 214 is distributed by the waveguide 240 and absorbed by the blue luminophores 242 in the blue sub-pixel 202 to generate blue light. The red and green sub-pixels 204, 206 operate in a similar fashion to convert either the ambient light or the MTV back light, or both, into red and green emissions, respectively, for viewing.

Figure 5:
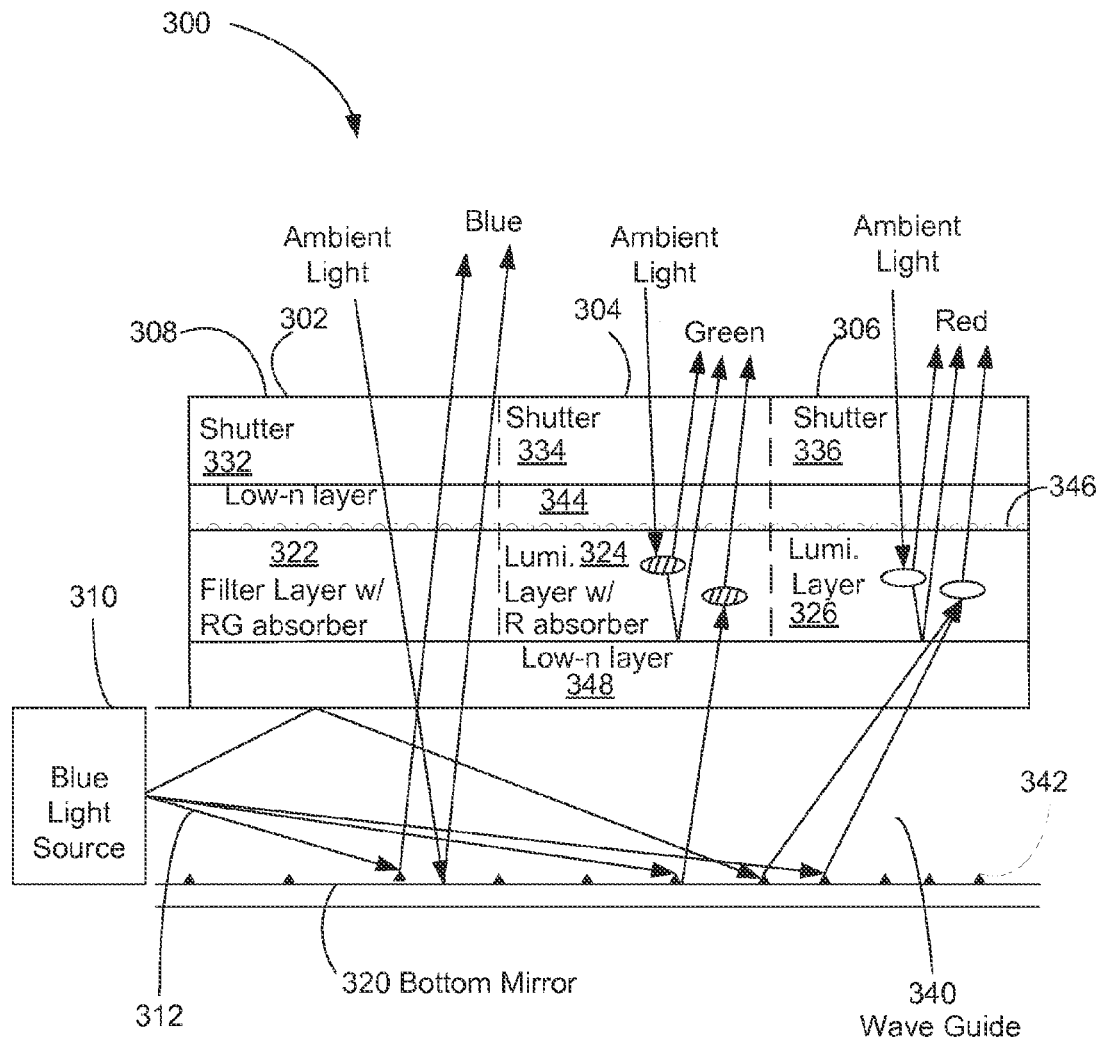
FIG. 5 is a schematic cross-sectional view of a color pixel in another embodiment of a reflective color display with luminescence and backlighting.

FIG. 5 shows another embodiment of a luminescent color reflective pixel 300 with backlighting. In this embodiment, the pixel structure is similar to that of FIG. 3, but the unpatterned red-green mirror 154 in FIG. 3 is omitted. Specifically, the pixel 300 has a blue sub-pixel 302, a green sub-pixel 304, and a red sub-pixel 306. The red sub-pixel 306 has a shutter 336 and a luminescent layer 326, which contains red luminophores. The green sub-pixel 304 has a shutter 334 and a luminescent layer 324, which contains green luminophores and an absorbing material for absorbing red wavelengths. The blue sub-pixel has a shutter 332 and a filter layer 322 containing an absorbing material for red and green wavelengths. A bottom mirror 320 is disposed below the three sub-pixels. The mirror 320 forms a lower surface of a waveguide 340 for coupling back lighting from a blue light source 310 to the sub-pixels.

In contrast with the pixel in FIG. 3, however, there is no wavelength-selective mirror disposed between the luminescent layers 324, 326, and the bottom or 320. As a result, the red or green light generated in the red or green luminescent layer may pass downward into the backlighting waveguide 340 and be reflected by the bottom mirror 320. Most of the reflected light may go up and be emitted by the respective sub-pixel. In this regard, the backlighting waveguide 340 may be made thin relative to the in-plane dimensions of the sub-pixels. This has the effect of minimizing the crosstalk between the sub-pixels caused by light scattered into the waveguide in one sub-pixel and then out of the waveguide into another sub-pixel. To provide enhanced performance, the structures 342 that scatter the blue backlight out of the waveguide into the sub-pixels may be made to minimize the scattering of red and green light into the waveguide. This may be accomplished easily if the backlight scatters are designed to scatter only a small fraction of the blue light passing down the waveguide out of the waveguide within a given sub-pixel. It may also be accomplished by using scattering structures that scatter blue light more strongly than red or green light. Structures that can provide such wavelength-selective scattering include plasmonic structures designed to preferentially scatter blue-light, such as appropriately-sized silver particles.

Also shown in FIG. 5, a low refractive index ("low-n") layer 344 is disposed between the luminescent layers and shutters. The low refractive index layer 344 is to enhance the coupling of the luminescent light through the shutters to the top surface 308 for viewing. To further control the output coupling, the layer 344 may contain output coupling structures, such as a lenslet array (i.e., a array of tiny lenses 346) with a different index of refraction, disposed on the top surface of the luminescent layers 324, 326. Also, another low refractive index layer 348 is disposed on the top surface of the waveguide 340 to enhance the reflection at the top surface of the waveguide. The low refractive index layers 344, 348 above and below the luminescent layers may be made thin relative to the in-plane dimensions of the sub-pixels. The two low refractive index layers 344, 348 may also be included in the embodiments of FIGS. 3 and 4 for the same purposes.

The pixel structure of FIG. 5 can also be modified to utilize near ultraviolet backlighting instead of blue backlighting. To that end, the light source 310 is replaced by a NUV light source. The bottom mirror 320 is made to reflect NUV, and the filter layer 322 in the blue sub-pixel 308 is replaced with a blue luminescence layer that contains blue luminophores and an absorbing material for absorbing red and green wavelengths.

Figure 6:
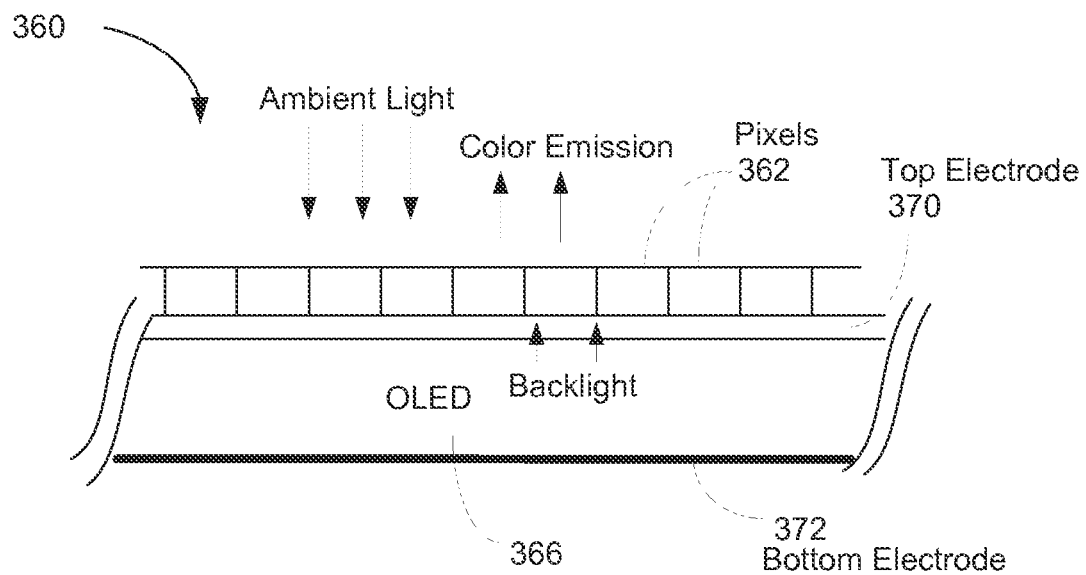
FIG. 6 is a schematic cross-sectional view of another embodiment of a luminescent color reflective display that uses a distributed light source for backlighting.

In the embodiments described above, the light source for backlighting is positioned to the side of the color pixels (e.g., edge-lit) and the back light is coupled to the pixels via a waveguide. It is possible to replace the lateral light source and waveguide with a distributed light source positioned directly below the pixels. FIG. 6 shows such an example. In this embodiment, the distributed light source in the display device 360 is a blue-emitting organic LED (OLED) 366. The OLED 366 is disposed underneath multiple color pixels 362, each of which may be constructed to have sub-pixels with upper layers structured according to the embodiments in FIGS. 3 and 5. The OLED light source 366 has a transparent top electrode 370 and a reflective bottom electrode 372. The reflective bottom electrode 372 serves the function of the blue-reflecting bottom mirrors in the embodiments of FIGS. 3 and 5. Also, in effect, the OLED light source 366 provides a substantially transparent path between the transparent top electrode 370 and the reflective bottom electrode 373. Similarly, a distributed NUN light source may be used to replace the lateral light source in the embodiment of FIG. 4 for backlighting. In embodiments that do not include an unpatterned mirror underneath the luminescent layers, the transparent top electrode and the OLED layer may be made thin relative to the in-plane dimensions of the sub-pixels to minimize the crosstalk between the sub-pixels.

It is possible to divide a distributed light source for backlighting into separately controlled patches, each of which underlies a plurality of pixels or even a single pixel. When more light is required in a given region of the color display, the corresponding light source patch can be powered to increase the brightness of that region. The to control the brightness by region enhances the flexibility of the display and may save power overall.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A reflective color display comprising:
at least one color pixel disposed to receive ambient light to front light the color pixel; and
a light source optically coupled to the color pixel to provide back light to backlight the color pixel, the color pixel including:
a plurality of sub-pixels including a first sub-pixel, a second sub-pixel, and a third sub-pixel, the first sub-pixel including a first luminescent layer containing a first luminescent material to convert a portion of an ambient light spectrum into light of a first color, the third sub-pixel without a luminescent layer and including a filter layer to absorb the first color and pass a third color, and
an unpatterned mirror disposed under the first luminescent layer of the first sub-pixel and extending through the first and second sub-pixels, the unpatterned mirror to reflect at least light of the first color and to transmit the back light to the first luminescent layer for conversion by the first luminescent material into light of the first color.

2. A reflective color display as in claim 1, wherein the second sub-pixel includes a second luminescent layer containing a second luminescent material for converting a portion of the ambient light spectrum into light of a second color.

3. A reflective color display as in claim 2, wherein the unpatterned mirror reflects light of the first color and the second color.

4. A reflective color display as in claim 3, wherein the first color has a wavelength longer than a wavelength of the second color, and wherein the second sub-pixel includes a material for absorbing light of the first color.

5. A reflective color display as in claim 1, wherein the third sub-pixel generates light of the third color by means of filtered reflection of the ambient light.

6. A reflective color display as in claim 1, further including a waveguide with a bottom mirror disposed below the unpatterned mirror for coupling the back light to the first and second sub-pixels.

7. A reflective color display as in claim 1, wherein the light source is a distributed light source disposed below the color pixel to provide backlighting.

8. A reflective color display comprising:
at least one color pixel disposed to receive ambient light to front light the color pixel, and
a light source optically coupled to the color pixel to provide back light to backlight the color pixel, the color pixel including:
a first sub-pixel, a second sub-pixel, and a third sub-pixel to produce light of a first color, a second color, and a third color, respectively, the first sub-pixel including a first luminescent layer containing a first luminescent material to generate light that contributes to the first color, and the second sub-pixel including a second luminescent layer containing a second luminescent material to generate light that contributes to the second color, and an unpatterned mirror disposed below the first and second luminescent layers and extending through the color pixel, the unpatterned mirror to reflect light of the first and second colors, to transmit the back light into the first and second luminescent layers for conversion by the first and second luminescent materials into light that contributes to the first color and the second color, respectively, and to transmit the back light into the third sub-pixel where it directly contributes to the third color, the unpatterned mirror to transmit light of the third color.

9. A reflective color display as in claim 8, wherein the color pixel further includes a bottom mirror disposed below the unpatterned mirror for coupling the back light from the light source to the first, second, and third sub-pixels.

10. A reflective color display as in claim 9, wherein the light source provides blue light or near ultra violet light for backlighting the color pixel.

11. A reflective color display comprising:

at least one color pixel disposed to receive ambient light to front light the color pixel, and a light source optically coupled to the color pixel to provide back light to backlight the color pixel, the color pixel including:

a plurality of sub-pixels including a first sub-pixel and a second sub-pixel, the first sub-pixel including a first luminescent layer including a first luminescent material to convert a portion of the ambient light spectrum into light of a first color;

a low refractive index layer below the first luminescent layer; and a bottom mirror disposed below the low refractive index layer, the bottom mirror to couple the back light to the first sub-pixel for conversion by the first luminescent material into light of the first color, wherein there is no wavelength selective mirror disposed between the first luminescent layer and the bottom mirror.

12. A reflective color display as in claim 11, wherein the color pixel further includes a waveguide disposed below the first luminescent layer, and wherein the bottom mirror forms a lower surface of the waveguide.

13. A reflective color display as in claim 11, wherein the light source provides blue light or near ultra violet light for backlighting the color pixel.

14. The reflective color display as in claim 2, wherein the second luminescent layer includes luminophores of the second color and a material to absorb light of the first color.

15. The reflective color display as in claim 14, wherein the material to absorb light of the first color includes at least one of a dye and a pigment.

16. The reflective color display as in claim 8, wherein the first color is red, the second color is green, and the third color is blue.

17. A reflective color display as in claim 11, wherein the color pixel further includes a waveguide disposed below and in contact with the first low refractive index layer, wherein the waveguide has a high refractive index, and wherein the bottom mirror forms a lower surface of the waveguide.

* * * * *